United States Patent Office 2,853,107
Patented Sept. 23, 1958

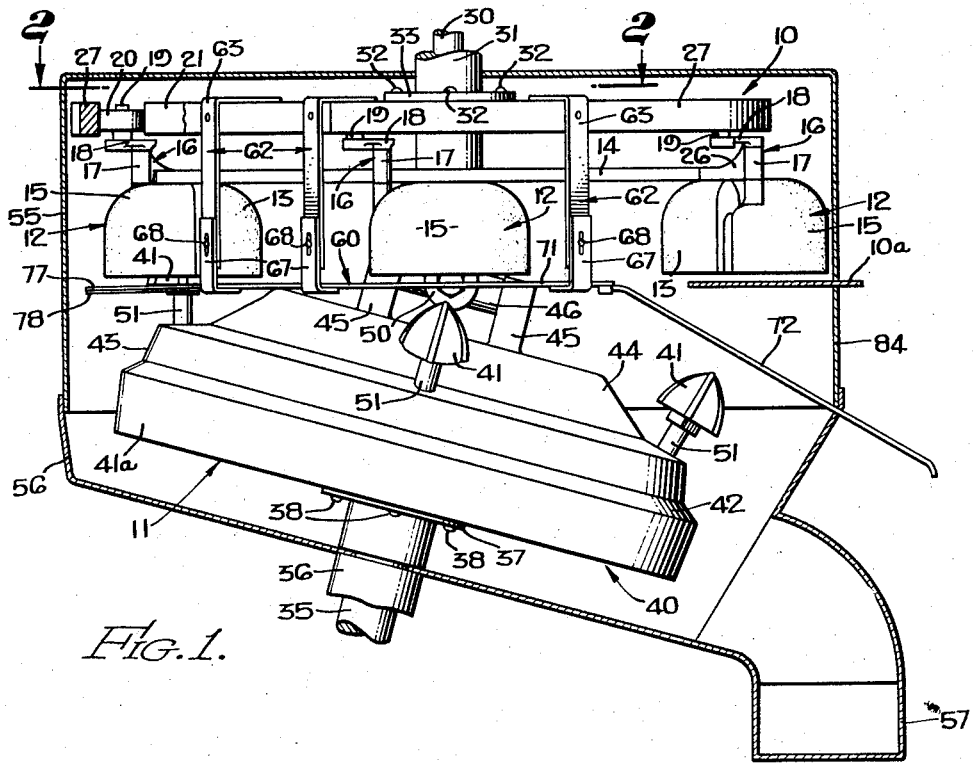

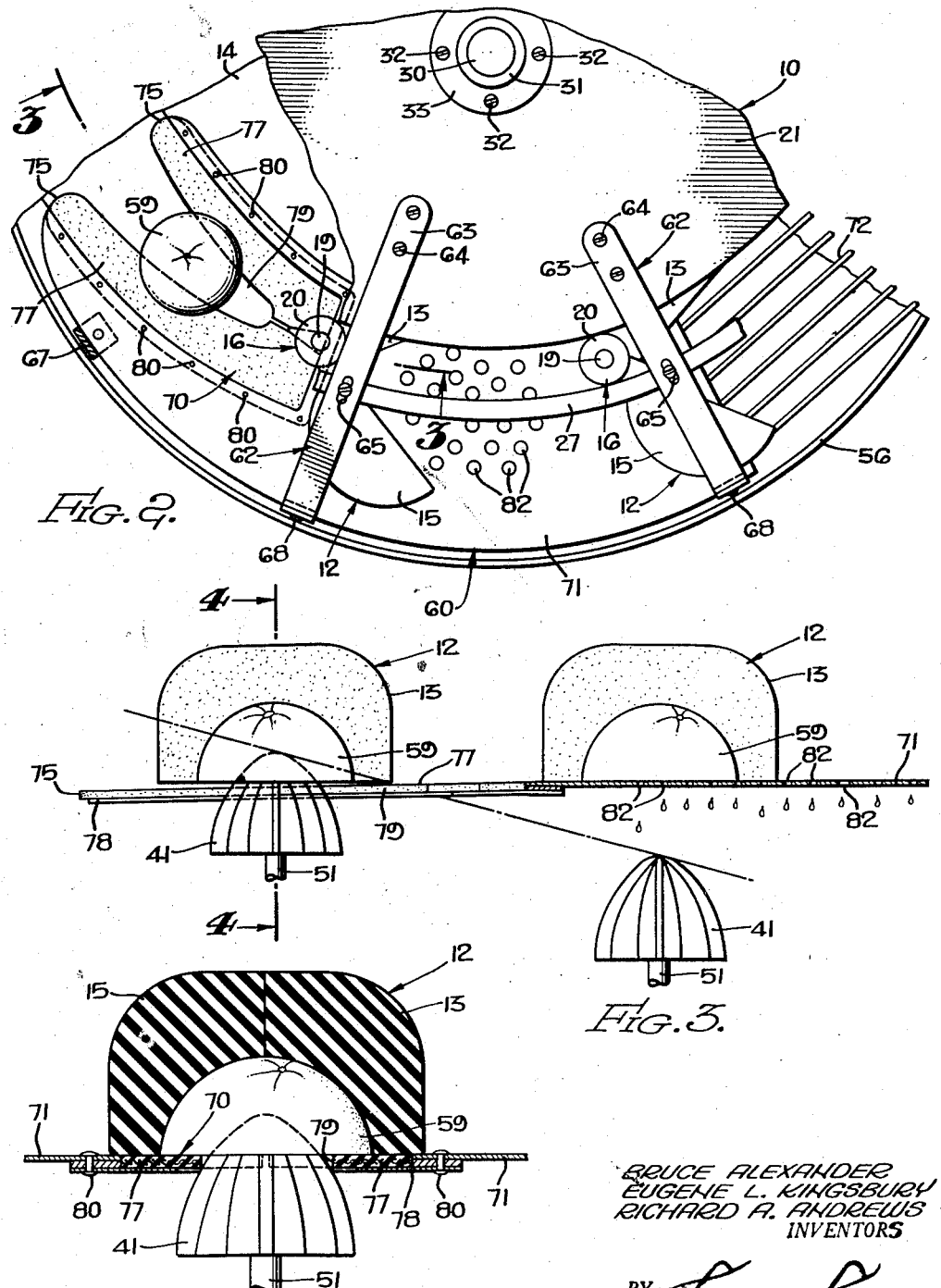

2,853,107

CITRUS JUICE EXTRACTING MACHINE

Bruce Alexander, San Marino, Eugene L. Kingsbury, La Habra, and Richard A. Andrews, Whittier, Calif., assignors to Brown Citrus Machinery Corporation, Whittier, Calif., a corporation of California Application March 26, 1956, Serial No. 573,836

7 Claims. (Cl. 146—3)

This invention relates to juice extracting devices and has particular reference to improvements in a citrus juice extracting machine.

In the operation of citrus juice extracting machines presently in commercial use, the fruit to be juiced is cut in half, picked up by a cup, the juice extracted by the use of a reamer and the remaining peels discarded. In being discarded, the peels fall below the plane of the cups, are caught by a grid and discharged through an opening in the machine provided for that purpose. In practice, this method of discharging the peels has not been entirely satisfactory. Since the peels fall below the plane of the cups, the juice, falling from the cups, washes over the peels. Thus, some of the juice is retained in the hemispherical recess of the peel and is lost when the peel is discharged, thereby reducing the yield. Moreover, the juice in washing over the peels tends to leach out the peel oils. These oils, being bitter in taste, adversely affect the flavor and quality of the finished juice.

Accordingly, one of the principal objects of our invention is to provide means to prevent the peels from falling below the plane of the cups.

A further object of our invention is to provide novel means for separating the fruit peel from the reamer.

Still another object of our invention is to provide novel means of the character described above which are inexpensive to fabricate and which may be readily installed on present machines.

Other objects and advantages of our invention, it is believed, will be readily apparent from the following detailed description of a preferred embodiment thereof when read in connection with the accompanying drawings in which:

Figure 1 is a side elevation of the fruit pickup and reamer units of a citrus juice extracting machine modified in accordance with our invention, partially sectionalized.

Figure 2 is an enlarged sectional view taken substantially on the line 2—2 of Figure 1.

Figure 3 is an enlarged sectional elevation taken substantially on the line 3—3 of Figure 2.

Figure 4 is an enlarged fragmentary elevation taken substantially on the line 4—4 of Figure 3, partially sectionalized.

Figure 5 is an enlarged plan view of the reverse reamer plate pad.

Referring now to the drawings, the fruit pickup unit 10 and the reamer unit 11 are substantially similar to those used in the citrus juice extracting machine disclosed in U. S. Patent No. 2,686,541 to Carl Harden and the means of cutting the fruit, feeding the cut fruit to the pickup unit 10 and power sources used with the present device may be substantially similar to those disclosed in that patent.

The fruit pickup unit 10 includes a plurality of cups 12 of resilient material which are formed in two halves, a fixed half 13 secured to the rotating cup carrier disk 14 and a movable half 15 hinged to the fixed half by means of a pivotal connection 16. The pivotal connection 16 consists of a pivot member 17 having a transversely-extending arm 18 in which is journaled a shaft 19 carrying a roller 20 which engages a fixed cam plate 21. The pivot member 17 is turnably supported on a pin (not shown) mounted on the bearing member 26 which is secured to the fixed cup half 13. The outer edge of the cam plate 21 is shaped so that as the rollers 20 travel around the plate the cups are caused to open and close to pick up and discharge the fruit halves. Positive movement of the opening of the cups is insured by a cam rail 27 secured to the cam plate and shaped to conform with the cam surface. The cup carrier disk 14 is keyed to a vertical shaft 30 mounted in a suitable bearing 31. The cam plate 21 is secured by, for example, bolts 32 to a flange 33 secured to the bearing 31.

Disposed below the lower end of the shaft 30 and extending angularly with respect thereto is a reamer unit driving shaft 35 mounted in a sleeve bearing assembly 36 and supported on the framework of the machine (not shown). The assembly 36 is provided with a circular flange 37 to which is attached by means of bolts 38 a circular reamer spindle carrying frame 40. The frame is suitably driven by a gear assembly and motor (not shown).

Mounted on the frame 40 are a plurality of reamers 41, there being one reamer for each cup. The spindle carrying frame 40 consists of a base plate 41a having formed thereon a circular angularly disposed juice deflecting plate 42 terminating outwardly in a circular rim 43. Secured to the upper circular edge of the plate 42 is a circular head or cap 44 which has formed integrally therewith a pair of upstanding arms 45 between which is secured a cross member 46. A split yolk element 50 is bolted to the underside of the cup carrier disk 14 and pivotally secured to the cross member 46. This arrangement forms a universal joint which serves to center the cup unit and reamer unit and to maintain these members in proper relation to each other.

The reamers 41 are mounted on spindles 51, each of which has its lower end journalled in the plate 41a and extends upwardly through the deflector plate 42. The position of the reamers 41 is such that the reamer on the high side of the spindle carrying frame 40 is within one of the cups. Means (not shown) are provided whereby the reamers may be rotated.

The fruit pickup unit and reamer unit are enclosed in a casing 55, the lower portion of which forms a pan 56 to catch the juice from which the collected juice flows by means of a drainpipe 57 to a receptacle (not shown).

The unit thus described forms no part of the invention but is described somewhat in detail so that the invention may be more fully understood.

In the operation of the device thus described, cut fruit enters the fruit pickup unit 10 on the plate 10a and is picked up therefrom by the closing cup halves 13 and 15. The rotating action of the unit 10 and the angularly disposed reamer unit 11 causes a reamer 41 to enter the fruit half and by the pressure and rotating actions of the reamer, squeeze or express the juice from the fruit. As the reamer 41 falls away from the cup 12, the peel 59 tends to follow the reamer, falling below the horizontal plane of the fruit pickup unit.

In accordance with this invention, means have been provided whereby the peel of the fruit is separated from the reamer 41, retained within the cup 12 and discharged from the machine so as to prevent the extracted juice from falling over or into it. As shown in the drawings, these means include a peel support assembly, generally indicated 60. This assembly is suspended beneath the cam plate 21 by, for example, a plurality of adjustable bracket assemblies 62. The upper brackets 63 are secured to the cam plate 21 and the cam rail 27 by means of bolts or screws 64. Since the cam rail 27 is not concentric with the peel support assembly 60, the upper brackets 63 are provided with elongated openings 65 so that the brackets 63 may be secured to the cam rail 27. The lower brackets 67 are secured to the under side of the support assembly 60 in a suitable manner and are adjustably fastened to the upper brackets 63 by means of bolts 68.

The peel support assembly 60 includes a bifurcated member 70, a support plate 71, and a discharge ramp 72 comprising a plurality of grid wires as shown in Figure 2. The peel support assembly 60 is positioned so that the lower outer edge of the reamer 41 passes between the extreme ends 75 of the bifurcated member 70 just as the angular motion of the reamer unit 11 causes the reamer 41 to start to fall away from the cup 12. The support plate 71 and the discharge ramp 72 are formed of a suitable material such as stainless steel.

The bifurcated member 70 may be formed from a flexible material supported by a thin sheet of stainless steel or other rigid material. It has been determined that an open weave "Dacron" fabric, impregnated with a "Hycar"-type synthetic rubber is a highly satisfactory flexible material. Although it may be made of one piece, in the preferred construction, a pair of tongue-like Hycar-impregnated Dacron separators 77 are secured by suitable means to a stainless steel separator support 78. A notch 79 formed in the plane of the bifurcated member 70 by the separators 77 progressively decreases in width in the direction of the rotating motion of the reamer 41. The notch 79 is widest between the ends 75 of the separators 77 and is formed to correspond to the diameter of the reamer 41 in the plane of the bifurcated member there being approximately 1/32" clearance between the edges of the separators and the outer periphery of the reamer. It will thus be understood that the notch in its widest dimension is slightly larger than the maximum diameter of the reamer and decreases progressively so that its diameter corresponds to but is always slightly larger than the diameter of that part of the reamer in the plane of the bifurcated member as the angular motion of the reamer unit causes the reamer to fall below that plane.

The support 78 does not extend inwardly beneath the separators to the edge of the notch 79, but instead is so formed that the ends and inner edges of the separators 77 remain flexible. The bifurcated member 70 is secured to the stainless steel support plate 71 by means of rivets 80 and is inclined, the ends 75 being lower than the general plane of the support plate 71. The support plate 71 contains a plurality of drainage openings 82 and extends beneath the cups 12 from the bifurcated member 70 to the discharge ramp 72. The ramp 72, which is suitably connected to the plate 71, is downwardly inclined and passes through an opening 84 in the side of the casing 55.

In operation, as the reamer 41 starts to fall away from the cup 12, the edge of the cup passes over the ends 75 of the separators 77 and the lower edge of the reamer passes into the notch 79. The peel 59, which tends to follow the reamer 41, contacts and is supported by the separators 77 and is pushed across the bifurcated member 70 by the moving cup 12. The inner edges of the separators 77 being flexible and the bifurcated member 70 being inclined, the peel 59 cannot fall, even partially, below the plane of the member 70 nor can the peel be cut or shredded or the reamer 41 be damaged by contact with the separators 77. The peel 59 is thus separated from the reamer and forceably retained within the cup 12. The motion of the cup pushes the peel across the support plate 71, any retained juice escaping through the drainage openings 82, and on to the discharge ramp 72. At this point the cam plate 21 and the cam rail 27 force the cup halves 13 and 15 to separate, dropping the peel 59 onto the ramp 72. The peel then slides down the ramp and through the opening 84 and is discharged.

While we have shown and described a specific embodiment of our invention, we do not limit ourselves to the exact details of the construction set forth, and the invention embraces such changes, modifications and equivalents of the parts and their formation and arrangement as come within the purview of the appended claims.

We claim:

1. In a citrus juice extracting machine, the combination of a fruit pickup unit, a reamer unit and a peel support assembly, a plurality of adjustable brackets joined to said fruit pickup unit by which said peel support assembly may be positioned below the plane of said fruit pickup unit, said peel support assembly comprising a bifurcated member, a peel support plate and a discharge ramp, said birfurcated member comprising a pair of flexible separators and a rigid separator support secured to and beneath said separators, said peel support plate being joined to said bifurcated member and containing a plurality of drainage openings, said discharge ramp being joined to said peel support plate and being inclined downwardly with respect to the plane of said peel support plate, whereby fruit peels are restrained from falling into said reamer unit and are discharged from said juice extracting machine.

2. In a citrus juice extracting machine, the combination of a fruit pickup unit, a reamer unit and a bifurcated member, said fruit pickup unit comprising a plurality of cups, said reamer unit being angularly disposed with respect to said pickup unit and comprising a plurality of reamers, rotating means whereby said reamers successively rise toward, enter into and fall away from one of said cups, said bifurcated member comprising a pair of flexible separators and a rigid separator support secured to and beneath said flexible separators forming a notch, the width of said notch decreasing progressively in the direction of motion of said reamers and being positioned below the plane of said cups, the plane of said bifurcated member intersecting said reamers as the reamers fall away from said cup to restrain fruit peels from falling into said reamer unit.

3. In a citrus juice extracting machine, the combination of a fruit pickup unit, a reamer unit and a peel support assembly, said fruit pickup unit comprising a plurality of cups, said reamer unit being angularly disposed with respect to said pickup unit and comprising a plurality of reamers, rotating means whereby said reamers successively rise toward, enter into and fall away from one of said cups, a plurality of adjustable brackets joined to said fruit pickup unit by which said peel support assembly may be positioned below the plane of said fruit pickup unit, said peel support assembly comprising a bifurcated member, a peel support plate and a discharge ramp, said bifurcated member comprising a pair of flexible separators and a rigid separator support secured to and beneath said flexible separators forming a notch, the width of said notch decreasing progressively in the direction of motion of said reamers and being positioned below the plane of said cups, the plane of said bifurcated member intersecting said reamers as the reamers fall away from said cup, said peel support plate being joined to said bifurcated member and containing a plurality of drainage openings, said discharge ramp being joined to said peel support plate and being inclined downwardly with respect to the plane of sadi peel support plate whereby fruit peels are restrained from falling into said reamer unit and are discharged from said juice extracting machine.

4. In a citrus juice extracting machine, the combination of a casing, a fruit pickup unit, a reamer unit and a peel support assembly within said casing, a plurality of adjustable brackets joined to said fruit pickup unit by which said peel support assembly may be positioned below the plane of said fruit pickup unit, said fruit pickup unit comprising a plurality of cups, said reamer unit being angularly disposed with respect to said pickup unit and comprising a plurality of reamers, rotating means whereby said reamers successively rise toward, enter into and fall away from one of said cups, said peel support assembly comprising a bifurcated member, a peel support plate and a discharge ramp, said bifurcated member comprising a pair of flexible separators and a rigid separator support secured to and beneath said flexible separators forming a notch, the width of said notch decreasing progressively in the direction of motion of said reamers and being positioned below the plane of said cups, the plane of said bifurcating member intersecting said reamers as the reamers fall away from said cup, said peel support plate being joined to said bifurcated member and containing a plurality of drainage openings, said discharge ramp being joined to said peel support plate and being inclined downwardly with respect to the plane of said peel support plate and passing through an opening in the side of said casing whereby fruit peels may be restrained from falling into said reamer unit and are discharged from said juice extracting machine through said casing.

5. The combination as claimed in claim 4 in which the bifurcated member is inclined downwardly with respect to the plane of the peel support plate.

6. The combination as claimed in claim 4 in which the pair of flexible separators are formed from an open weave fabric impregnated with a synthetic rubber.

7. In a citrus juice extracting machine, the combination of a fruit pickup unit, a reamer unit and a bifurcated member, said fruit pickup unit comprising a plurality of cups, said reamer unit being angularly disposed with respect to said pickup unit and comprising a plurality of reamers, rotating means whereby said reamers successively approach, enter into and withdraw from one of said cups, said bifurcated member lying substantially in a plane below said cups and being positioned with respect to said reamer unit at the point where said reamers start to withdraw from said cups, said reamers intersecting the plane of said bifurcated member as the reamers are withdrawn from the cup to restrain fruit peels from falling into said reamer unit.

References Cited in the file of this patent

UNITED STATES PATENTS

| 2,199,876 | Brown | May 7, 1940 |
| 2,296,873 | Rachford | Sept. 29, 1942 |

FOREIGN PATENTS

| 138,240 | Australia | Sept. 25, 1947 |